US011461198B2

(12) United States Patent
Murray

(10) Patent No.: US 11,461,198 B2
(45) Date of Patent: *Oct. 4, 2022

(54) METHOD TO DISABLE OR REBOOT UNRESPONSIVE DEVICE WITH ACTIVE UPLINK IN A RING NETWORK

(71) Applicant: HEWLETT PACKARD ENTERPRISE DEVELOPMENT LP, Houston, TX (US)

(72) Inventor: Christopher Murray, Boynton Beach, FL (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/224,639

(22) Filed: Apr. 7, 2021

(65) Prior Publication Data
US 2021/0224167 A1 Jul. 22, 2021

Related U.S. Application Data

(63) Continuation of application No. 15/962,015, filed on Apr. 25, 2018, now Pat. No. 10,997,041.

(51) Int. Cl.
*G06F 11/20* (2006.01)
*H04L 12/24* (2006.01)
*H04L 12/46* (2006.01)
*H04L 12/437* (2006.01)
*H04L 41/0654* (2022.01)
*G06F 11/14* (2006.01)

(52) U.S. Cl.
CPC ........ *G06F 11/2023* (2013.01); *H04L 12/437* (2013.01); *H04L 12/4641* (2013.01); *H04L 41/0654* (2013.01); *G06F 11/1441* (2013.01)

(58) Field of Classification Search
CPC ............ G06F 11/1441; G06F 11/2023; H04L 41/0672; H04L 41/0654; H04L 12/4641; H04L 12/437
See application file for complete search history.

(56) References Cited

U.S. PATENT DOCUMENTS 6,496,858 B1 12/2002 Frailong et al.
7,106,969 B1 9/2006 Lichtman et al.
9,332,567 B1 5/2016 Ali et al.
(Continued)

OTHER PUBLICATIONS

US 8,401,382 B2, 03/2013, Zheng et al. (withdrawn)
(Continued)

*Primary Examiner* — Abdulkader M Alriyashi
(74) *Attorney, Agent, or Firm* — Hewlett Packard Enterprise Patent Department

(57) ABSTRACT

A method and system are disclosed to enable an FLM designated as an owner, in a group of frames having redundant FLMs per frame, to ensure that an unresponsive "active" uplink is disabled, prior to allowing another uplink in the frame to become the active uplink. A group of frames, configured in a ring network topology, may only have a single uplink at a time. Otherwise, two or more concurrent active uplinks may cause a network loop that may result in total network failure (e.g., network crash). The disclosed method utilizes a coordination between an FLM owner on the ring and the neighbor FLM, in the same frame as the non-responsive FLM, to disable the active uplink, prior to transitioning to a new active uplink for the group of frames.

14 Claims, 13 Drawing Sheets

(56) References Cited

U.S. PATENT DOCUMENTS

2008/0275975 A1 11/2008 Pandey et al.
2010/0088440 A1 4/2010 Banks et al.
2011/0317995 A1 12/2011 Zheng

OTHER PUBLICATIONS

Chebli, L. et al., "Cooperative Uplink of Two Mobile Stations with Network Coding Based on the WiMax LDPC Code," GLOBECOM 2009 IEEE Global Telecommunications Conference, 2009, http://citeseerx.ist.psu.edu/viewdoc/download?doi=10.1.1.157.1392&rep=rep1&type=pdf.

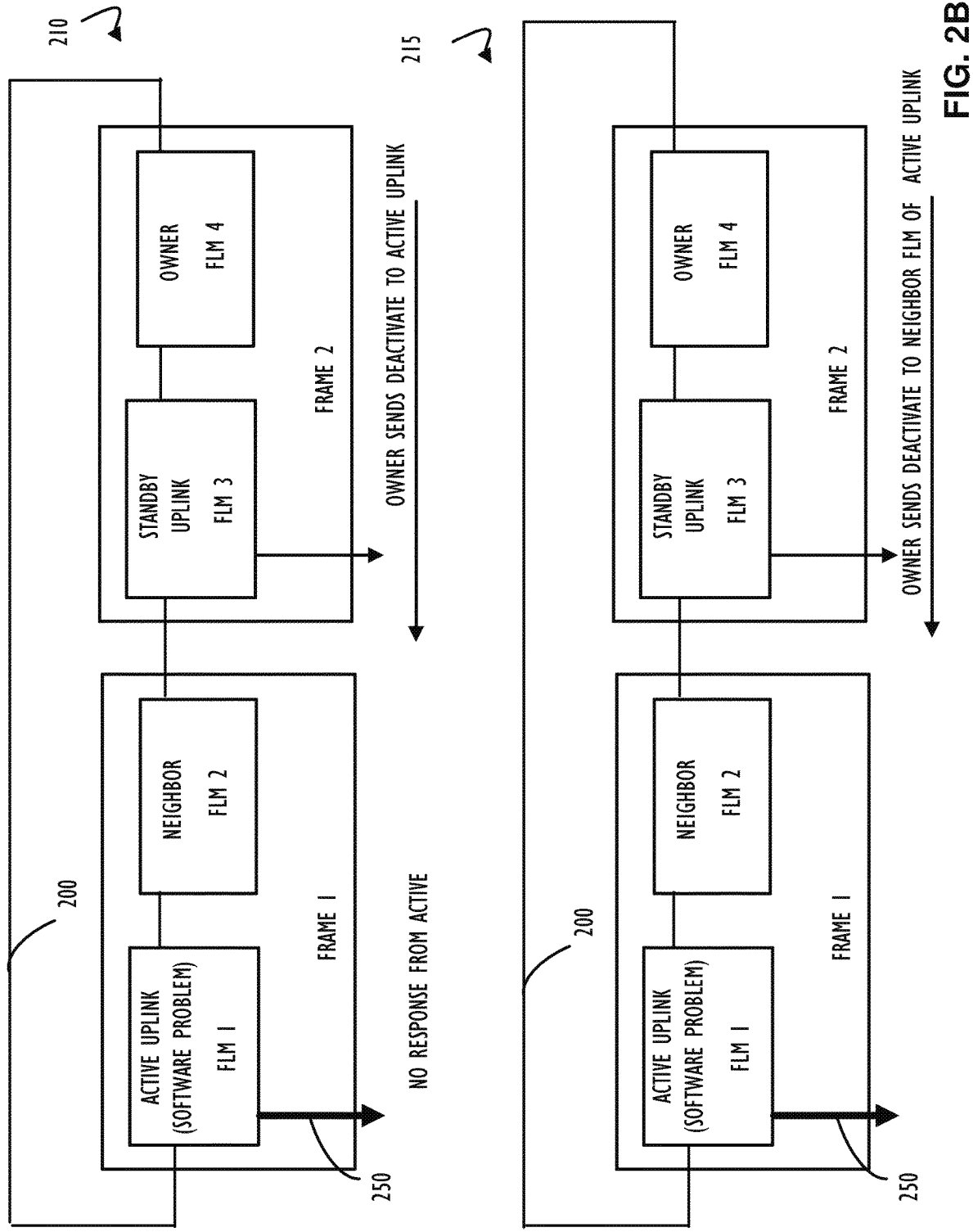

| | Byte 1 | Byte 2 | Byte 3 | Byte 4 |
|---|---|---|---|---|
| 1 | Dest MAC Byte 1 | Dest MAC Byte 2 | Dest MAC Byte 3 | Dest MAC Byte 4 |
| 5 | Dest MAC Byte 5 | Dest MAC Byte 6 | Src MAC Byte 1 | Src MAC Byte 2 |
| 9 | Src MAC Byte 3 | Src MAC Byte 4 | Src MAC Byte 5 | Src MAC Byte 6 |
| 13 | VLAN TPID | VLAN TPID | VLAN ID | VLAN ID |
| 17 | Eth Type | Eth Type | MEL / Version | Opcode |
| 21 | Flags | TLV Offset | Source | Command |
| 25 | Advertisement | Ping Status | Node ID Owner | Node ID Owner |
| 29 | Node ID Owner | Node ID Owner | Node ID Owner | Node ID Owner |

FIG. 3A

Uplink Message Fields used for Owner EM and Remote EMs

400

- Source (byte 23)
  1. Owner
  2. Remote
  3. Active
  4. *Neighbor PLM to Active Uplink*

- Owner Commands (byte 24)
  1. Activate - the specified EM is determined to have the active management port
  2. Deactivate
  3. *Disable Neighbor Active Uplink*

- Advertisement (byte 25)
  1. Link Active – True
  2. Link Active - False

Uplink Port Table

450

| 6 Bytes | 16 Bytes | 6 Bytes | 16 Bytes | 1 Byte | 1 Byte | 1 Byte |
|---|---|---|---|---|---|---|
| MAC Address EM | IPv6 Address EM | MAC Address Neighbor | IPv6 Address Neighbor | Source | Link State | Present |
| MAC Address EM | IPv6 Address EM | MAC Address Neighbor | IPv6 Address Neighbor | Source | Link State | Present |

FIG. 4

METHOD TO DISABLE OR REBOOT UNRESPONSIVE DEVICE WITH ACTIVE UPLINK IN A RING NETWORK

CROSS REFERENCE TO RELATED APPLICATION

This application is a continuation of co-pending U.S. patent application Ser. No. 15/962,015 filed Apr. 25, 2018, the entire contents of which are hereby incorporated by reference as though fully set forth herein.

BACKGROUND

In the field of scalable compute resources, network connectivity between nodes, blades, or frames, of network modules may represent a primary communication path for sharing data between those nodes. The data may represent inputs to compute process (e.g., data or applications), outputs of compute resources (e.g., compute results) communications to coordinate distributed processes, and other types of data. In some architectures, nodes of network modules within a blade server, cluster, or frame may be connected to each other using redundant frame link modules (FLMs) in each frame (e.g., node).

A group of frames is typically configured in a ring network topology. When configured in a ring network topology, a group of frames may only have a single active uplink to external network resources. If two uplinks become active concurrently and error condition may be caused in the network and the network may crash. Coordinating amongst FLMs in a group of frames to ensure that only a single uplink is designated as active allows the group of frames to function properly. If the active uplink becomes unresponsive measures may need to be taken to address the recovery of the FLM containing the current active uplink without enabling two uplinks concurrently.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which:

FIGS. 2A-C are functional block diagrams representing an example of using a neighbor FLM in the same frame as the active uplink to assist in addressing issues with an unresponsive active uplink, according to one or more disclosed implementations;

FIGS. 3A-C are a table describing one possible format of an uplink message used by an owner network module and remote network modules, according to one or more disclosed implementations;

FIG. 4 is a block diagram of a possible set of message fields and an uplink port table that may be used to implement the techniques of this disclosure, according to one or more disclosed embodiments;

DETAILED DESCRIPTION

Figure 1:
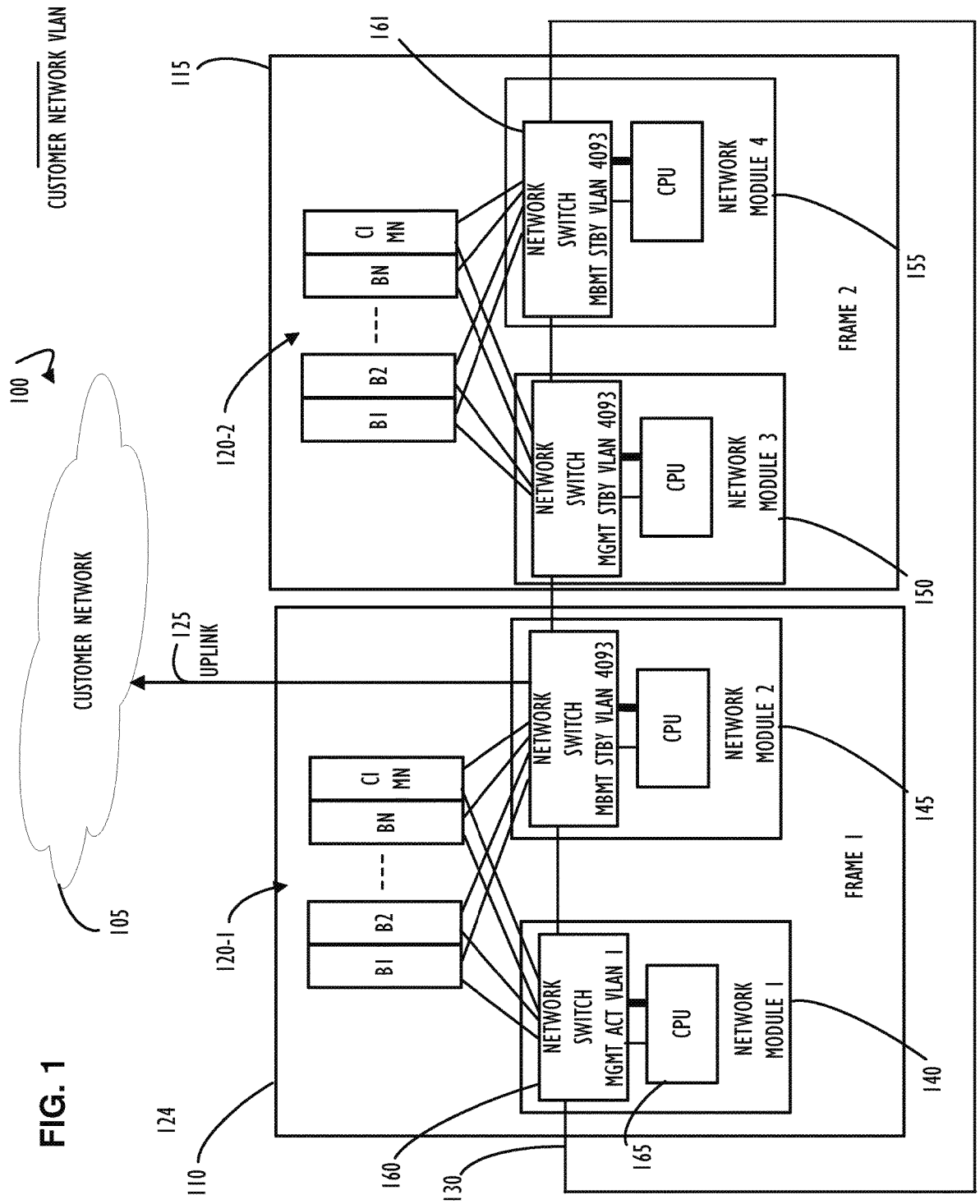
FIG. 1 is a functional block diagram of a computer infrastructure including multiple frame scalable compute resources, a customer VLAN, and a management VLAN, and a single uplink to the customer network, according to one or more disclosed implementations.

Network security, fault tolerance, and performance represent important considerations for computer networks. One fault tolerance aspect includes ensuring that connected network devices are configured properly and are not allowed to affect other systems when an individual device exhibits failure or degradation. Sometimes this requires restarting or isolating a failed (or degraded) device. Further, in some scalable compute resource implementations, network modules provide access to compute modules in each frame and therefore network efficiency may have an increased importance. That is, a scalable compute resource may rely more heavily on efficient network communication between nodes than a traditional distributed system.

Multiple frames may be configured as a saleable compute resource. Each frame may contain multiple compute blades and provides an uplink service to an external network so that compute blade resources may be accessed and serviced externally. A ring network topology is typical for a group of frames. Each frame in the ring is typically configured with redundant modules called frame link modules (FLMs) that contain a CPU and a switch which provide redundancy for a network connection to the compute blades. Within a given frame, one FLM is active and the other is standby. Each FLM may send commands to enable/disable links on the others network switch using remote sockets. Each FLM may also reboot the other FLM in the same frame (referred to as a neighbor FLM). Every FLM in the ring has the capability to provide the uplink to the external network but only one is designated as an active uplink for the entire group of frames in the ring. A ring "owner" may be responsible for designating which FLM may enable its uplink to the external network to provide ring connectivity. If communication is lost between the ring Owner and the FLM with the active uplink because it has become unresponsive, another uplink should not be enabled until it has been determined that the active uplink has been disabled by some method. This disclosure provides a method of verifying that when an FLM with the active uplink becomes unresponsive, the neighbor FLM (other FLM in the same frame) will verify that the uplink has been disabled allowing the Owner to safely enable a new uplink.

In one or more disclosed embodiments, the disclosed method provides a technique to recover from an unresponsive device (FLM) that is providing the active uplink to an external network for a group of frames. The unresponsive FLM may have its uplink disabled or rebooted by the neighbor FLM in the same frame. When a FLM becomes unresponsive in a network ring there are several possible root causes. For example, the unresponsive FLM may have been unplugged, rebooted, or may have a software failure. Out of these three conditions, a software failure may represent a condition that is difficult to identify and resolve, in part, because a software failure may cause intermittent issues rather than the FLM just going away. Further, an unplugged FLM or one that has been rebooted may not be as likely to cause a problem in the network when a new uplink is enabled (e.g., because it has simply gone away).

Recall, the owner FLM in the network designates which FLM may have the active uplink. Accordingly, for desirable results in most implementations, if an FLM with the active uplink has a software failure and does not respond to messages from the owner in the network, the owner FLM should verify that the uplink of the unresponsive FLM has been disabled before it can request another FLM enable its uplink. In that manner, there is less likelihood of "competing" active uplinks. One verification method may be implemented by having the owner communicating with the neighbor FLM (e.g., through a management VLAN or other mechanism) and sending commands and receiving status on the state of the unresponsive FLM. One advantage of this implementation is that manual intervention may be minimized (likely eliminated) when an FLM with the active uplink is identified as being unresponsive. A network technician (e.g., system administrator) is not required to physical address the situation by determining which FLM had/has the active uplink and disabling it manually, for example to cause a failover. A second advantage of disclosed embodiments is preventing potential network loops. For example, if the FLM with the active uplink experienced a software issue and the uplink continued to stay enabled, when the owner enabled a new uplink (without the disclosed disablement verification) then there would likely be a loop in the network. In short, by using the neighbor to cause a reboot of the FLM with the active uplink in the case of a software failure, the reboot may allow a recovery path for the software failure condition of that FLM (e.g., via restart).

To summarize, in some network implementations of scalable compute resources, all the frames are connected in a ring topology. Each frame has two modules called FLMs. Each FLM has an external link that connects to an FLM in an adjacent frame and an internal link that connects to the other FLM in the same frame. The FLMs in the same frame provide redundant connectivity to blades in the frame. Each FLM has an uplink port that may be connected to an external network. Only one uplink in the ring may be active at a time.

Referring to FIG. 1, an example computer infrastructure 100 is illustrated. In this example, customer network 105 is connected to a set of frames (represented by frame 1 110, and frame 2 115). Of course, more than two frames may be present but for simplicity of this disclosure only two are shown in this example. As indicated by arrow 120-1, frame 1 may be configured with a set of blades (B1, B2, . . . BN) and a Composable Infrastructure (CI) module. Similarly, arrow 120-2 indicates that frame 2 may be configured in a like manner. Frame 1 further includes two network modules 140 and 145 (sometimes referred to as a Frame Link Module (FLM)). Frame 2 also include two network modules 150 and 155. These network modules provide connectivity for the compute resources represented by the blades. Each of the blades is shown with a network connection to a network switch 160 disposed within each individual network module (e.g., network module 1, 140). Each network module further includes a CPU 165 to facilitate configuration, monitoring, and maintenance of a corresponding network switch 160.

Connectivity from a set of frames to a customer network is typically provided by a single uplink 125 from exactly one of the plurality of network switches that exist across the multiple FLMs of a group of connected frames. That is, all communications external to the group of connected frames passes through uplink 125. As further illustrated in computer infrastructure 100, customer VLAN 130 connects each of the network switches 160 in an ethernet ring network. A second standby management VLAN 4093 may be implemented on network module 2 145, network module 3 150, and network module 4 155 as shown by network switch 161. Management standby VLAN 4093 is not actually connected to other devices but instead is in standby mode with corresponding links enabled. That is, standby management port VLAN 4093 is connected to the uplink switch, and enabled, it will just not communicate with any device, Note, in a proper configuration of a group of frames, each network switch will be directly connected to each neighboring switch on a customer network VLAN (either in the same frame or an adjacent frame) and no intervening network devices are present.

A virtual LAN (VLAN) refers to a broadcast domain that is partitioned and isolated in a computer network at the data link layer (OSI layer 2). LAN is the abbreviation for local area network and in this context virtual refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4093 management VLAN 135 in FIG. 1.

In this disclosure, a ring topology of network modules will be discussed. However, the proposed techniques are expected to work for any network topology and should not be limited to a ring topology. In one implementation, the disclosed technique addresses the network uplinks connected to the external network. As shown in FIG. 1, a single network may have at least four uplinks (125, and a corresponding uplink (not shown) for each of FLMs 140, 150, and 155) with only a single active uplink (125 in this example) being connected to an external network such as customer network 105. The first enclosure (e.g., frame 1, 110) has the active uplink 125 to external customer network 105. The other three uplinks of the other FLMs 140, 150, and 155, may be considered to be configured in an unused and reserved VLAN so that they may send and receive packets between each other, but all other received traffic is dropped. Accordingly, a standby link in each of frames 140, 150, and 155 may be enabled but isolated to have fast link switchover if the active uplink (e.g., 125 in this example) becomes disconnected or has a problem. The managing software, in this example the G8032 owner, may track which of the standby links have a link that may take over for a failed active uplink. The disclosed techniques may send "heart beat" type messages periodically between the FLMs to ensure they are all functioning properly. Also note that in computer infrastructure 100, only one frame has a single network module configured in a management active VLAN 1 and all other network modules represent redundant backup network modules configured in a management standby VLAN 4093 (e.g., network module 4 155, network module 3 150, and network module 2 145).

Figure 2A:
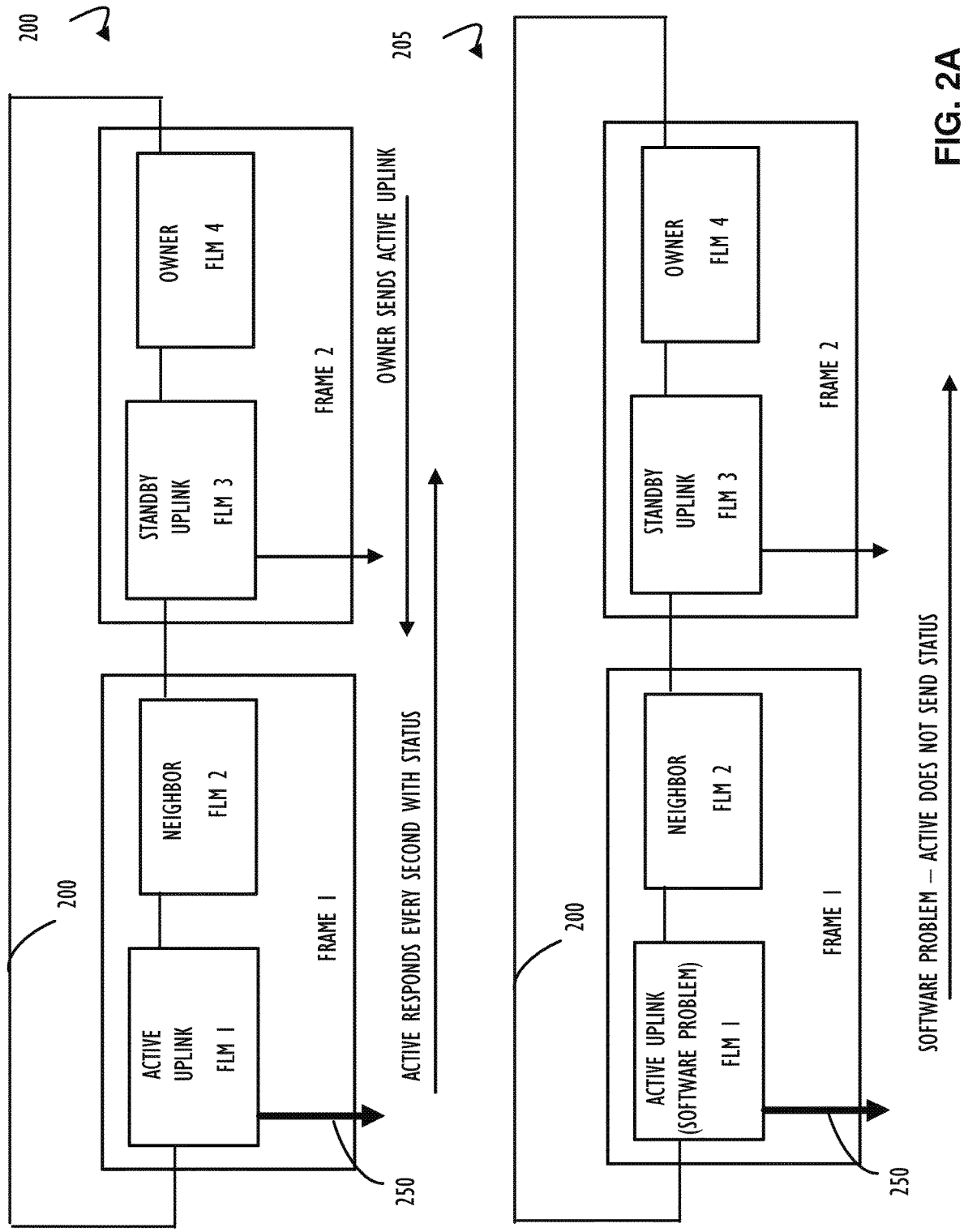
Figure 2C:
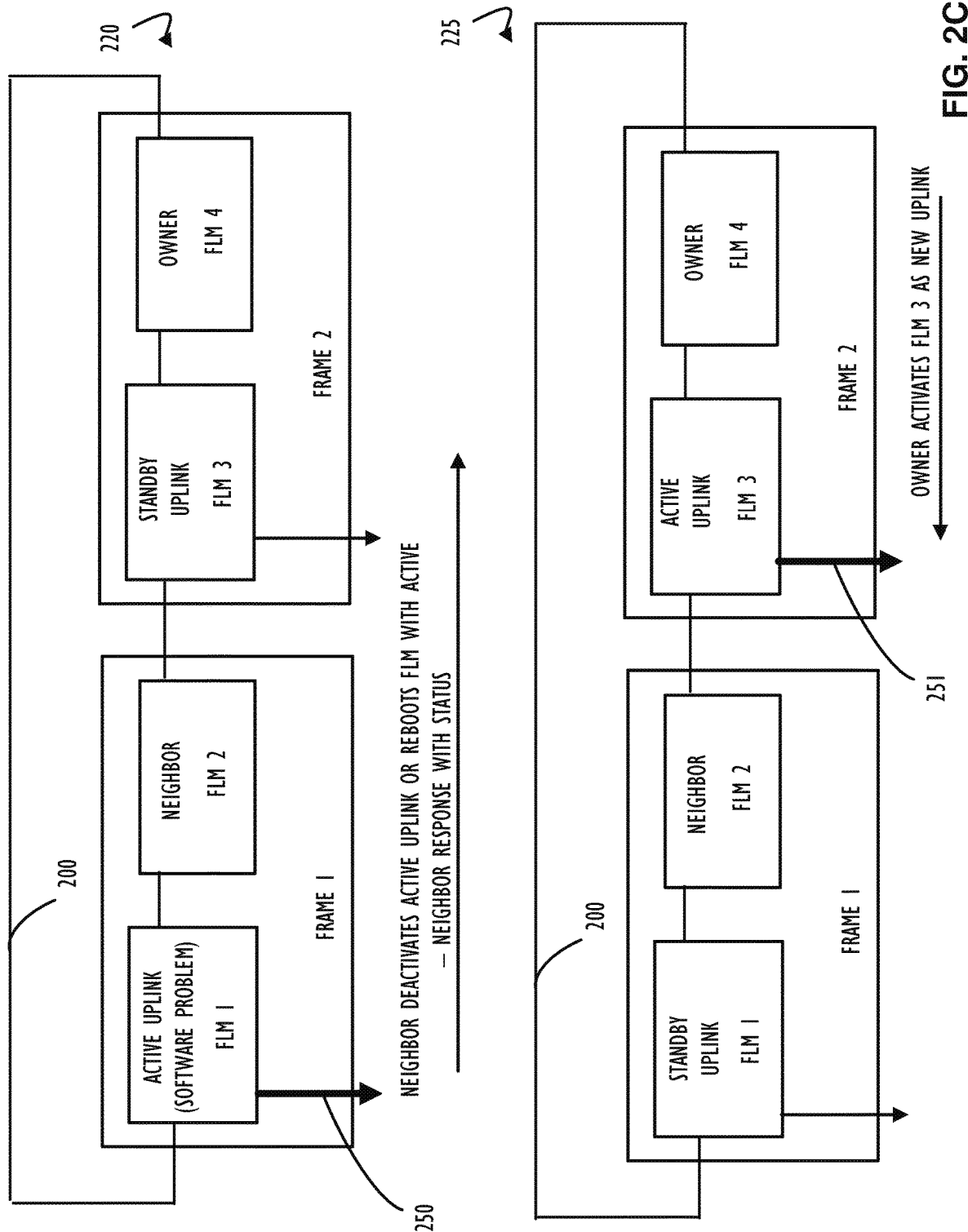

Referring now to FIGS. 2A-C, the example ring topology 200 of FIG. 2A is illustrated with only has two uplinks (i.e., from FLM 1 and FLM 3) but each FLM in the ring may have an uplink. One FLM in the ring is called the owner of the ring (FLM 4 in this example). In this implementation, all FLMs in the ring that have an uplink port connected will send a message to the owner stating they have an uplink and it may be used as the active (e.g., register with the owner FLM). The contents of this message may contain the MAC address of the FLM with the uplink and the MAC address of the other FLM in the frame (i.e., its neighbor). The owner may save the uplink messages in a table and request one FLM enable its uplink and become active and the other uplinks in the table will be designated as standby uplinks. One example table is explained further below with reference to FIGS. 3A-C, and 4.

Continuing with FIG. 2A ring topology 200, the FLM with the active uplink 250 may send status messages the owner stating its link is active. Alternatively, if the cable is unplugged the FLM may send a message stating the uplink is inactive and the owner FLM may then select, for example from the registration table, one of the standby uplinks to become active. The owner FLM may then monitor the status messages from the FLM that it has selected to be the active link (e.g., heartbeat shown in example ring topology 200). If at some point, there are no status message heartbeats within in a predetermined heartbeat period, for example 1 second, (see ring topology 205 in FIG. 2A) or there is no response from the active, (see ring topology 210 in FIG. 2B) the owner FLM (FLM 4 in this example) may send a deactivate request, as shown in example ring topology 210 of FIG. 2B, to the FLM with the active uplink. In normal operating conditions, the FLM with the active link is expected to reply (not shown) with a deactivate response.

There are a few reasons that an FLM may not send a link deactivated or respond to a deactivate request from the owner FLM that include but are not limited to: 1. FLM unplugged; 2. FLM Rebooted; and 3. Software issue. If an FLM is unplugged or rebooted it will not cause network issues because the uplink will have been disabled. A software issue may cause an intermittent or persistent problem that may be noticed by the disclosed heartbeat technique. As mentioned above, if the FLM with the active uplink does not respond or deactivate its uplink and the owner activates a new uplink a network loop could be created. Accordingly, as illustrated in example ring topology 215 of FIG. 2B, the owner FLM may send a command to the neighbor FLM (FLM 2 in this example) in the frame with the active uplink FLM for that neighbor FLM to either disable the uplink on the FLM with the active uplink or possibly reboot the ELM, The FLMs in the same frame (neighbors) may send commands to both switches on each FLM via remote sockets to initiate the requested action. Also, in the case of a rebooting access may be enabled through direct hardware access, for example, using general purpose input/output (GPIO) pins. The neighbor FLM in the frame may then send a status back to the owner FLM stating the action that was performed (example ring topology 220 in FIG. 2C) and that the owner FLM may now enable a new uplink. The owner FLM may then will then send an activate command to a different FLM (FLM 3 in the example ring topology 225 in FIG. 2C) with an uplink so that the different FLM will host the active uplink.

Figure 3B:
Figure 3C:

Referring now to FIGS. 3A-C is a single table shown in sections 300, 325, and 350 for readability. The table of FIGS. 3A-C describes an example of the table mentioned above that describes one possible format of an uplink message used by an owner network module and remote network modules, according to one or more disclosed implementations. The table may be used by the owner FLM to coordinate its activities with other FLMs and to determine which FLMs to interact with to perform the techniques of this disclosure.

FIG. 4 is a block diagram of a possible set of message fields and an uplink port table that may be used to implement the techniques of this disclosure, according to one or more disclosed embodiments.

Figure 5A:
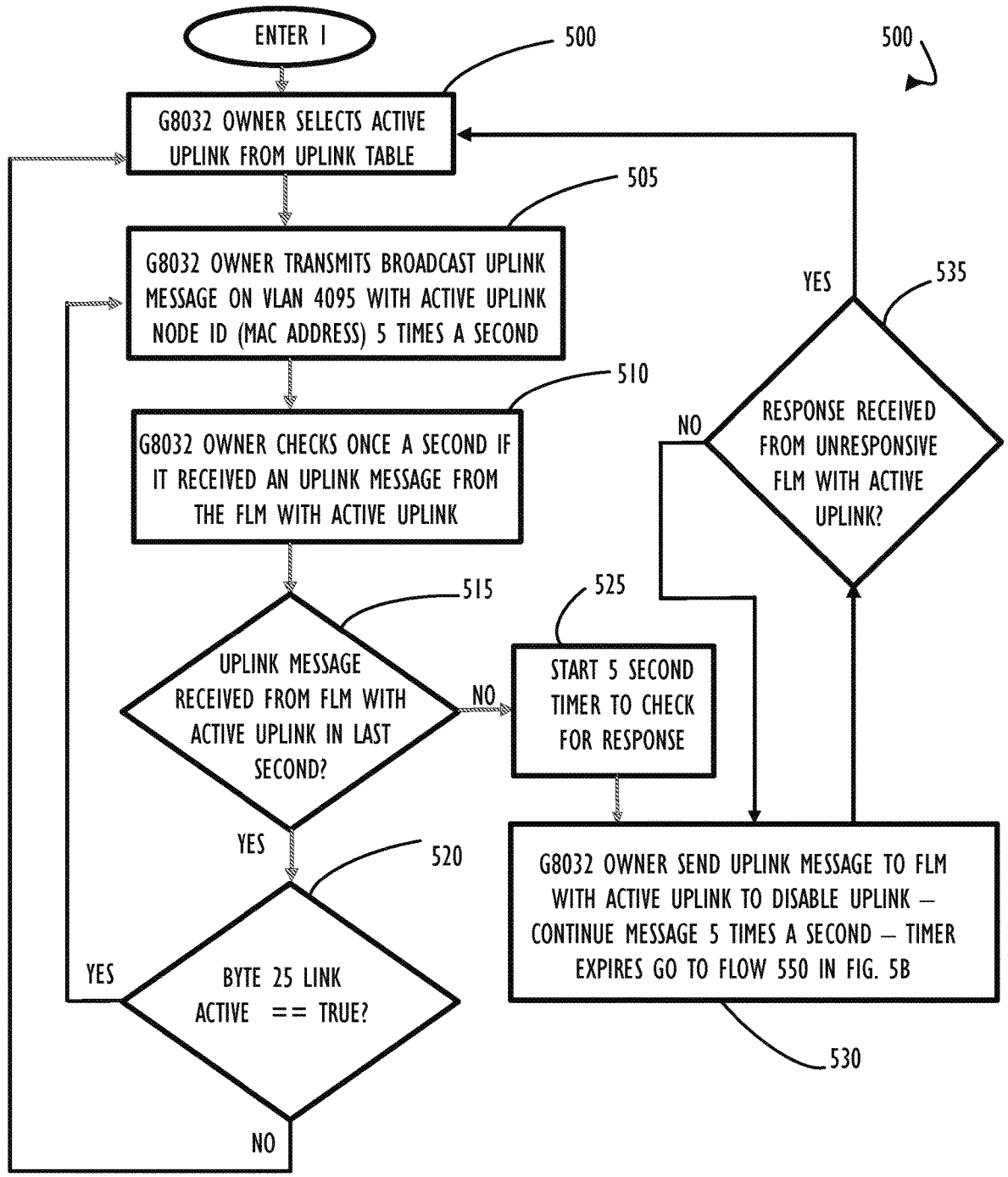
FIGS. 5A-B are a flow chart representing a possible method to perform an active problem resolution for a non-responsive uplink using coordination between an owner FLM and a neighbor FLM of the active uplink, according to one or more disclosed implementations.
Figure 5B:
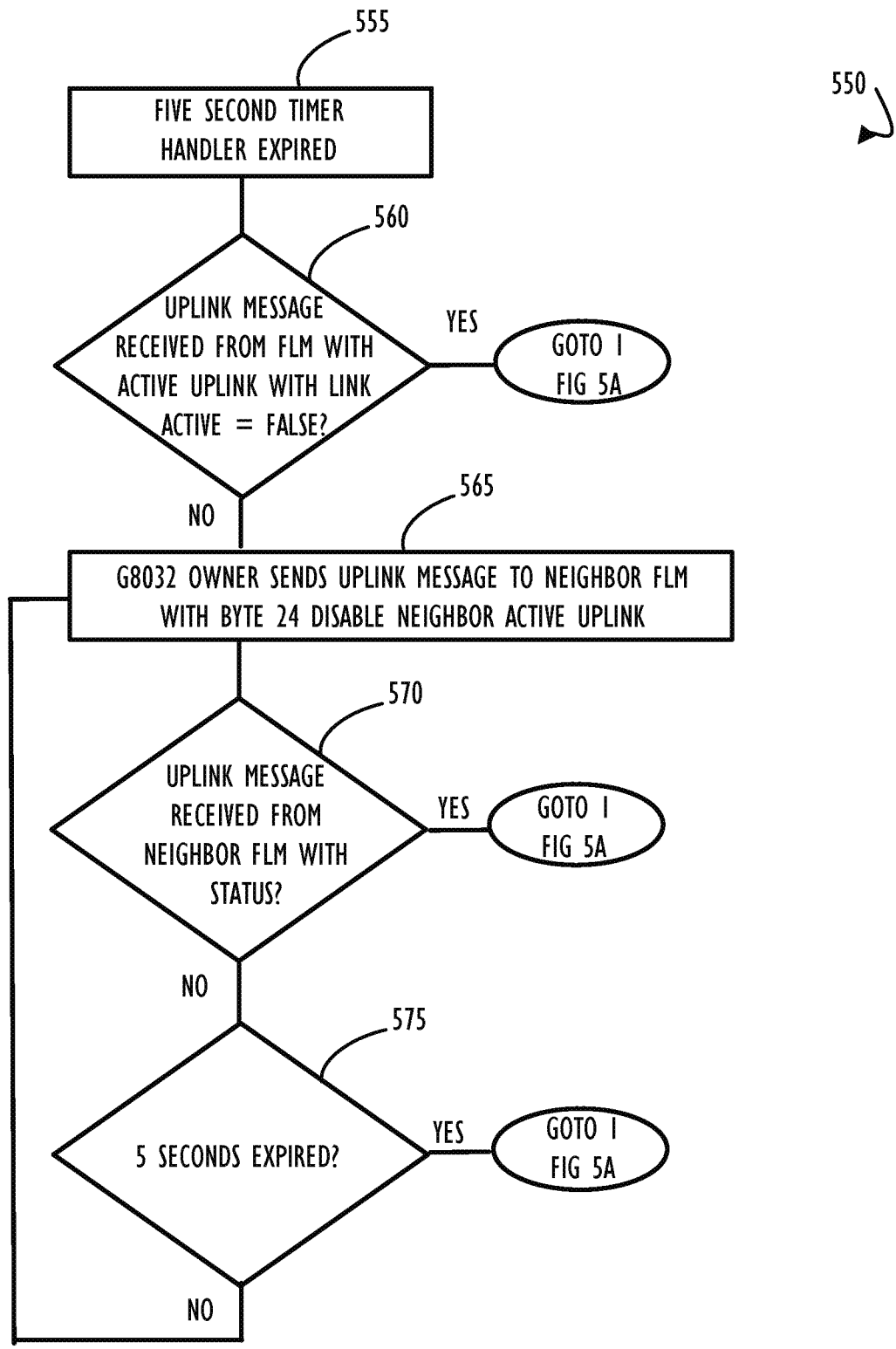

FIGS. 5A-B illustrate a single flow chart 500 (with a sub-part of ow chart 500 represented by flow chart portion 550) representing a possible method to perform non-compliant device detection, according to one or more disclosed implementations. For example, one sequence of detecting if an FLM with an active uplink needs to be restarted. Flow chart 500 begins at block 500 (note entry point 1 returns to block 500) where a GB832 owner (e.g., the owner FLM mentioned above) selects an active uplink from a registration table (e.g., the table of FIGS. 3A-C). At block 505 an owner transmits a broadcast uplink message on VLAN 4095 with an active uplink node id (MAC address) five times a second, Of course, the number of times per second (e.g., timing) may be configurable. Block 510 indicates that an owner FLM checks once a second to see if it has received an uplink message from the FLM with the active uplink. Decision 515 determines if an appropriate message has been received and if not (the NO prong) flow continues to block 525 for possible corrective action. If it has (the YES prong) flow continues to decision 520 where a check may be determined that the message indicates the link is still active. If not, flow returns to block 500 to select an active uplink. If yes, flow returns to block 505 where the broadcast message is continued.

Block 525 indicates that a five second (configurable) timer may be started to determine if a response is received. Block 530 indicates that the owner FLM may send an uplink message to the FLM with the active uplink to disable the uplink and continue that message at 5 times a second (configurable). If the timer expires at block 530 flow will continue with sub-part 550 of FIG. 5B. Decision 535 is repeatedly checked during the configurable timeout period set in block 525. If no response is received from the previously determined unresponsive active uplink the process waits for the timer to expire. However, if a message is received prior to the timer expiring, (the YES prong of decision 535) flow continues back to block 500 to begin the process again. This message indicates that the non-responsive FLM has responded within the allowed grace period of the timer.

Referring now to FIG. 5B flow chart 550 represents a sub-part of flow chart 500 that may be performed when the above-mentioned timer expires as indicated at block 555. Decision 560 detects if an uplink message has been received from the FLM with the active uplink and that message status indicates active is FALSE. If so, flow returns to block 500 where an active uplink may be selected by the owner FLM. Block 565 indicates that the owner FLM sends an uplink message to the neighbor FLM (as determined by the above-mentioned registration table) with byte 24 indicating a request to disable the neighbor active uplink FLM. Decision 570 detects if an uplink message has be received from the neighbor FLM with a status of the previously sent message. If so, flow returns to block 500 where the owner FLM may select a new active uplink. If not, (NO from 570) decision 575 determines if 5 seconds (configurable) have expired and if not another message may be sent to the neighbor FLM. If this timer has expired flow returns to block 500 of FIG. 5A.

Figure 6:
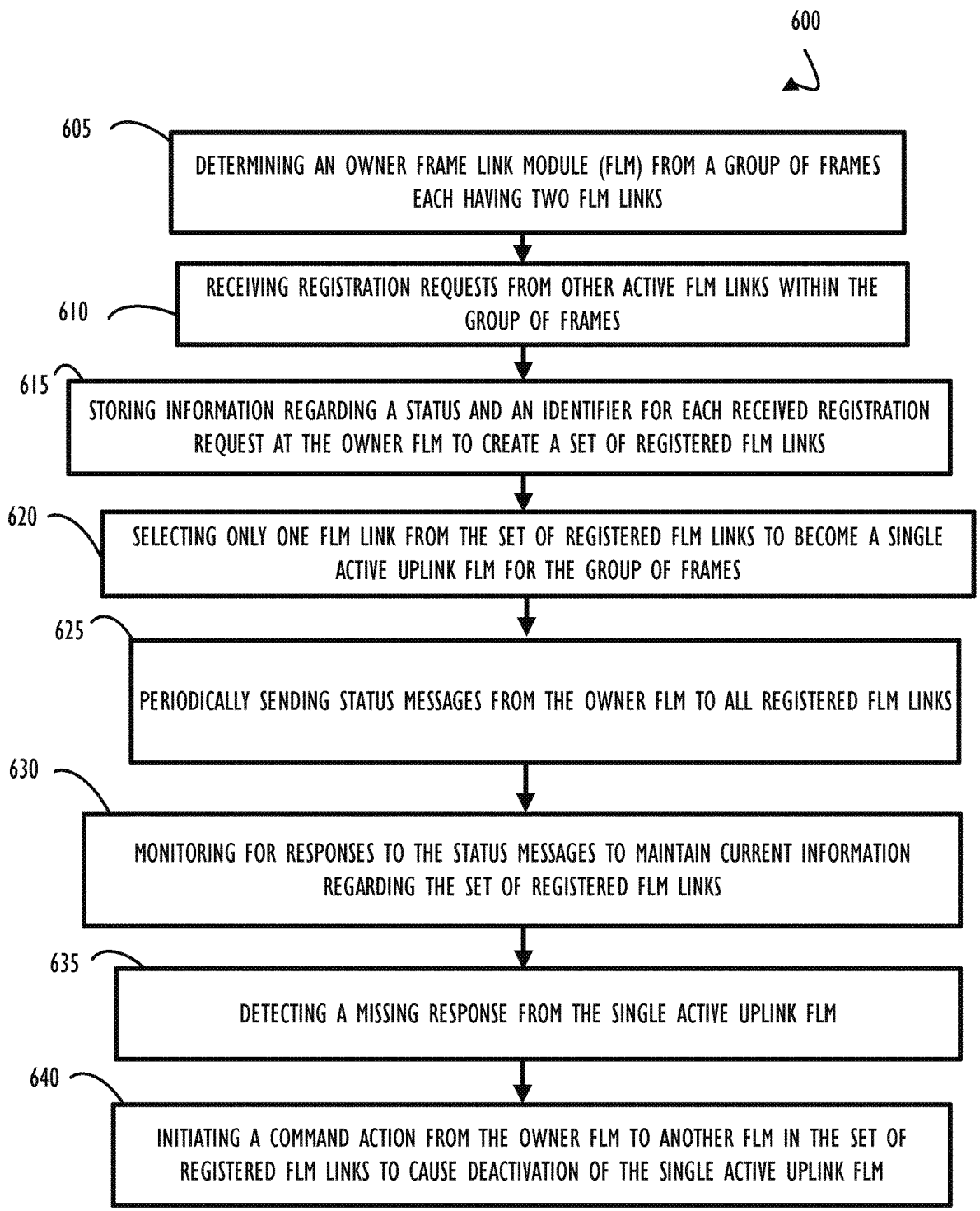
FIG. 6 represents an example method that may be used to actively address a non-responsive active uplink using a neighbor FLM to the non-responsive active uplink, according to one or more disclosed embodiments.

FIG. 6 represents an example method 600 that may be used to actively detect a non-responsive FLM with an active uplink, according to one or more disclosed embodiments. Method 600 begins at block 605 by determining an owner frame link module (FLM) from a group of frames each having two FLM links. Method 600 continues at block 610 by receiving registration requests from other active FLM links within the group of frames. Method 600 continues at block 615 by storing information regarding a status and an identifier for each received registration request at the owner FLM to create a set of registered FLM links, Method 600 continues at block 620 by selecting only one FLM link from the set of registered FLM links to become a single active uplink FLM for the group of frames. Method 600 continues at block 625 by periodically sending status messages from the owner FLM to all registered FLM links. Method 600 continues at block 630 by monitoring for responses to the status messages to maintain current information regarding the set of registered FLM links. Method 600 continues at block 635 by detecting a missing response from the single active uplink FLM. Method 600 completes at block 640 by initiating a command action from the owner FLM to another FLM in the set of registered FLM links to cause deactivation of the single active uplink FLM.

Figure 7:
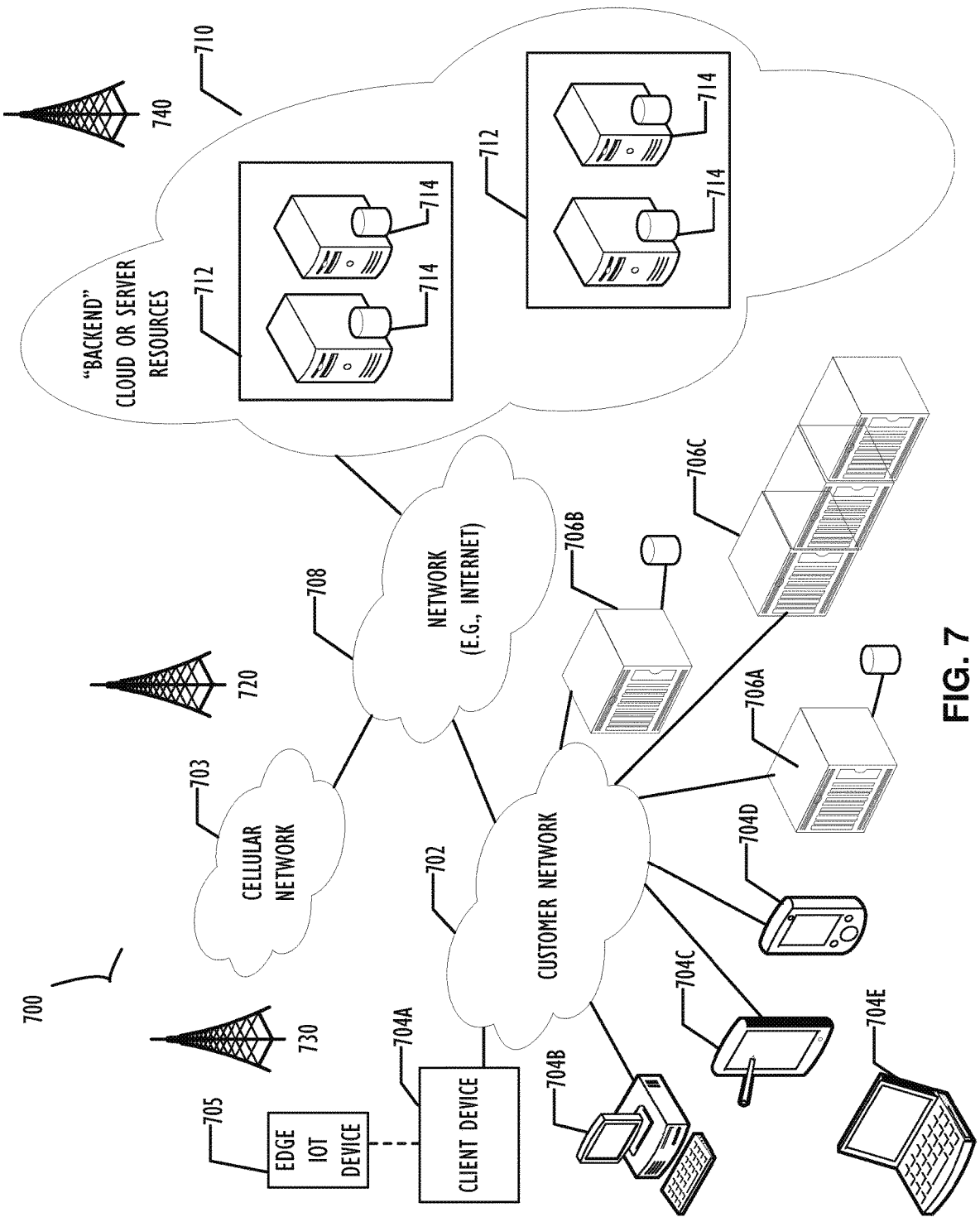
FIG. 7 represents a computer network infrastructure that may be used to implement all or part of the disclosed non-responsive uplink corrective actions, according to one or more disclosed embodiments.

FIG. 7 represents a computer network infrastructure 700 that may be used to implement all or part of the disclosed non-responsive FLM with active uplink remediation technique or provide information flow between a system performing the technique and other computer networks, according to one or more disclosed embodiment, Network infrastructure 700 includes a set of networks where embodiments of the present disclosure may operate. Network infrastructure 700 comprises a customer network 702, network 708, cellular network 703, and a cloud service provider network 710, In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a foreign device detection method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

Figure 8:
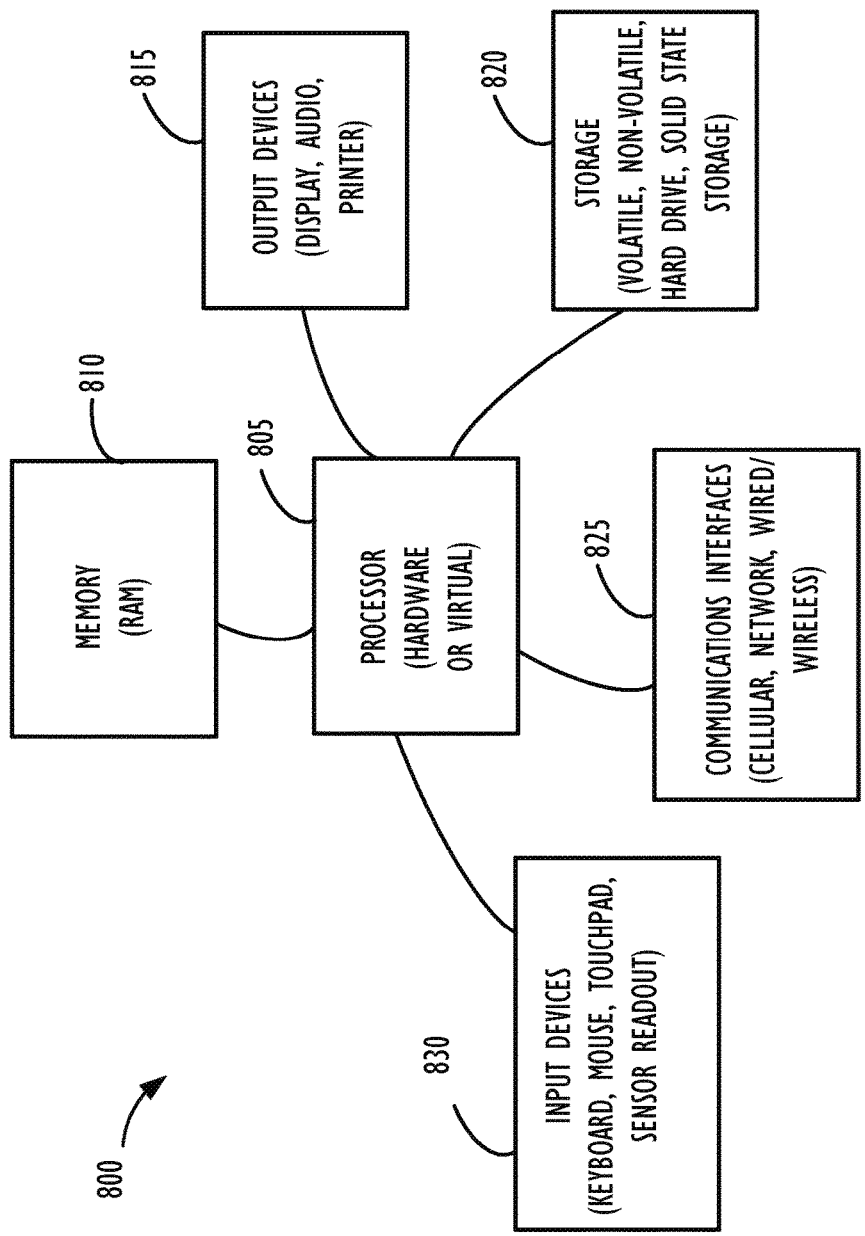
FIG. 8 illustrates a computer processing device that may be used to implement the functions, modules, processing platforms, execution platforms, communication devices, and other methods and processes of this disclosure.

FIG. 8 illustrates a computer processing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
    determining an owner frame link module (FLM) from a group of frames each having two FLM links;
    receiving registration requests from other active FLM links within the group of frames;
    storing information regarding a status and an identifier for each received registration request at the owner FLM to create a set of registered FLM links;
    selecting one FLM link from the set of registered FLM links to become a single active uplink FLM for the group of frames;
    detecting a missing response from the single active uplink FLM to a status message; and
    initiating a command action from the owner FLM to another FLM in the set of registered FLM links to cause deactivation of the single active uplink FLM, wherein the command action from the owner FLM is sent to a neighbor FLM of the single active uplink FLM to request deactivation of the single active uplink, the deactivation initiated locally on a frame by the neighbor FLM.

2. The computer implemented method of claim 1, wherein the owner FLM is selected based on a comparison of MAC addresses across all active FLM links in the group of frames.

3. The computer implemented method of claim 1, wherein the command action from the owner FLM is sent to a neighbor FLM of the single active uplink FLM to request re-initialization of an FLM hosting the single active uplink, the re-initialization initiated locally on a frame by the neighbor FLM.

4. The computer implemented method of claim 3, wherein the re-initialization comprises a reboot of the FLM hosting the single active uplink is imitated using general purpose input output interface of a CPU communicatively coupled to the single active uplink.

5. The computer implemented method of claim 1, further comprising:
   detecting a deactivation of the single active uplink FLM in response to the command action; and
   selecting a new active uplink FLM for the group of frames.

6. A non-transitory computer readable medium comprising computer executable instructions stored thereon that when executed by one or more processing units, perform a method to alter an active uplink for a group of frames, the method comprising:
   determining an owner frame link module (FLM) from a group of frames each having two FLM links;
   receiving registration requests from other active FLM links within the group of frames;
   storing information regarding a status and an identifier for each received registration request at the owner FLM to create a set of registered FLM links;
   selecting one FLM link from the set of registered FLM links to become a single active uplink FLM for the group of frames;
   detecting a missing response from the single active uplink FLM to a status message; and
   initiating a command action from the owner FLM to another FLM in the set of registered FLM links to cause deactivation of the single active uplink FLM, wherein the command action from the owner FLM is sent to a neighbor FLM of the single active uplink FLM to request deactivation of the single active uplink, the deactivation initiated locally on a frame by the neighbor FLM.

7. The non-transitory computer readable medium of claim 6, wherein the owner FLM is selected based on a comparison of MAC addresses across all active FLM links in the group of frames.

8. The non-transitory computer readable medium of claim 6, wherein the command action from the owner FLM is sent to a neighbor FLM of the single active uplink FLM to request re-initialization of an FLM hosting the single active uplink, the re-initialization initiated locally on a frame by the neighbor FLM.

9. The non-transitory computer readable medium of claim 8, wherein the re-initialization comprises a reboot of the FLM hosting the single active uplink is imitated using general purpose input output interface of a CPU communicatively coupled to the single active uplink.

10. The non-transitory computer readable medium of claim 6, wherein the method further comprises:
    detecting a deactivation of the single active uplink FLM in response to the command action; and
    selecting a new active uplink FLM for the group of frames.

11. A computer network, comprising:
    a plurality of frame link modules, each containing a network communications interface communicatively coupled to the computer network;
    a memory; and
    one or more processing units, communicatively coupled to the memory and at least one of the network communications interfaces, wherein the memory stores instructions, that when executed by the one or more processing units, cause the one or more processing units to provide an uplink changeover function for a group of frames, the uplink changeover function configured to:
       determine an owner frame link module (FLM) from a group of frames each having two FLM links;
       receive registration requests from other active FLM links within the group of frames;
       store information regarding a status and an identifier for each received registration request at the owner FLM to create a set of registered FLM links;
       select one FLM link from the set of registered FLM links to become a single active uplink FLM for the group of frames;
       detect a missing response from the single active uplink FLM to a status message; and
       initiate a command action from the owner FLM to another FLM in the set of registered FLM links to cause deactivation of the single active uplink FLM, wherein the command action from the owner FLM is sent to a neighbor FLM of the single active uplink FLM to request deactivation of the single active uplink, the deactivation initiated locally on a frame by the neighbor FLM.

12. The computer network of claim 11, wherein the owner FLM is selected based on a comparison of MAC addresses across all active FLM links in the group of frames.

13. The computer network of claim 11, wherein the command action from the owner FLM is sent to a neighbor FLM of the single active uplink FLM to request re-initialization of an FLM hosting the single active uplink, the re-initialization initiated locally on a frame by the neighbor FLM.

14. The computer network of claim 11, wherein the uplink changeover function further comprises:
    detect a deactivation of the single active uplink FLM in response to the command action; and
    select a new active uplink FLM for the group of frames.

* * * * *